US007345275B2

(12) United States Patent
Amirav et al.

(10) Patent No.: US 7,345,275 B2
(45) Date of Patent: Mar. 18, 2008

(54) MASS SPECTROMETRIC BASED METHOD FOR SAMPLE IDENTIFICATION

(76) Inventors: Aviv Amirav, 5 Ha Yaar Alley, Hod Hasharon 452y69 (IL); Tal Alon, 26 Shai Agnon Street, Apt. 21, Tel-Aviv 69362 (IL)

( * ) Notice: Subject to any disclaimer, the term of this patent is extended or adjusted under 35 U.S.C. 154(b) by 301 days.

(21) Appl. No.: 11/303,645

(22) Filed: Dec. 16, 2005

(65) Prior Publication Data

US 2006/0284068 A1 Dec. 21, 2006

(51) Int. Cl.
*B01D 59/44* (2006.01)

(52) U.S. Cl. ........................ 250/282; 702/127; 702/22; 702/23; 702/24; 702/28

(58) Field of Classification Search ................ 250/282, 250/281, 288; 702/127, 22, 23, 24, 26, 27, 702/28, 30
See application file for complete search history.

(56) References Cited

U.S. PATENT DOCUMENTS 6,983,213 B2 * 1/2006 Wang .......................... 702/85
2003/0003595 A1 * 1/2003 Amirav ...................... 436/173

* cited by examiner

*Primary Examiner*—Robert Kim
*Assistant Examiner*—Michael Maskell
(74) *Attorney, Agent, or Firm*—J. Harold Nissen; Lackenbach Siegel, LLP

(57) ABSTRACT

There is provided a mass spectrometric based method for sample identification, including the steps of introducing sample compounds into a vacuum chamber of a mass spectrometer in a seeded supersonic molecular beam, ionizing with electrons the sample compounds, being vibrationally cold molecules, in the supersonic molecular beam during their flight through an electron ionization ion source, mass analyzing the ionized sample compounds with a mass analyzer of a mass spectrometer to obtain a mass spectrum of at least one compound in the sample, identifying the molecular ion group of isotopomers in the mass spectrum, generating various molecular elemental formulas from the identified molecular ion and a pre-allocated list of elements, reducing the number of the molecular elemental formulas by the incorporation of chemical valence considerations and constraints, calculating isotope abundances for the generated elemental formulas, comparing the calculated isotope abundances with the experimentally obtained mass spectral isotope abundance, and listing the generated elemental formulas according to their degree of matching to the experimentally obtained mass spectral isotope abundance.

20 Claims, 2 Drawing Sheets

MASS SPECTROMETRIC BASED METHOD FOR SAMPLE IDENTIFICATION

BACKGROUND OF THE INVENTION

1. Field of the Invention

The present invention relates to a method for sample identification by mass spectrometry and more particularly the invention is concerned with a method for sample identification based on isotope abundance.

2. Background of the Invention

Gas chromatography (GC) and liquid chromatography (LC) are important analytical techniques used today for the separation, identification and quantification of a broad range of samples and mixture of compounds. While elution time can serve for crude sample identification, mass spectrometry is by far the best and most established technology for such identification, including at trace levels. For gas chromatography mass spectrometry (GC-MS), sample identification is predominantly based on the use of extensive available 70 eV electron ionization (EI) mass spectral libraries. Library based sample identification is performed via a comparison of the experimental mass spectrum to all the library mass spectra and than the provision of a hit list (such as of 100 compounds) of candidates for the sample identity with reducing order of fitting or of a matching parameter. Accordingly, sample identification with MS libraries is predominantly based on fragment ions that provide a compound specific "finger print". These libraries are both powerful and easy to use, however, sample identification with MS libraries is confronted with three major limitations: a) While the current libraries include a few hundred thousand compounds with the majority of all environmentally important compounds, a few millions of possible compounds are not included in the libraries, and in particular, novel synthetic organic compounds and drugs are (by definition) absent from the MS libraries; b) Occasionally, the library fails in sample identification either since the sample is not included in the library or due to coelution of two or more compounds or due to statistical errors; and c) About 30% of the sample compounds do not show a significant molecular ion in their 70 eV electron ionization MS. For these compounds sample identification through libraries alone cannot be trusted due to the possibility of false identification of a homologous compound or a degradation product. Thus, there is a need for additional supplementary and complementary means of preferably automated sample identification. An alternative approach for mass spectral sample identification is the measurement of accurate mass, typically with mass measurement precision of a few parts per million, followed by computer based conversion of that accurate mass into a list of possible elemental formulas which are arranged in order of increased deviation from the measured mass. For such inversion of experimental data into elemental formula the user must provide as an initial input parameter a short list of possible elements, otherwise the generated hit list will be too large and the calculation time could be too long even with the most powerful computers. The use of accurate mass for the provision of elemental formulas is based on the elemental specific distribution of isotopic masses. The method of accurate mass for the provision of elemental formulas is powerful but requires the use of costly mass spectrometer instrumentation such as time of flight, ion cyclotron or magnetic sectors. In addition, this method fails to provide any information if the molecular ion does not appear in the mass spectrum and can even give false identification on a fragment or impurity ion. Furthermore, in contrast to libraries, accurate mass does not provide any isomer identification information. Finally, for relatively large compounds and when the list of possible elements is not limited to very few elements, accurate mass can provide a too long list of candidates without real sample identification.

A closer look at the molecular ion in any typical mass spectrum reveals that it is actually a group of peaks spaced at 1 amu apart, emerging from the natural abundance of two or a few isotopes for most of the elements. It is well known and established that the relative height of the various molecular ion peaks that belong to the same molecule but with different isotopes (isotopomers) emerges from the relative abundances of the various isotopes and several programs are available for the calculation of the isotope abundance patterns from a given input of elemental formulas and natural isotope abundances of the various elements in that elemental formula. However, the opposite method of inversion of experimental mass spectral isotope abundance patterns into elemental formula (which is referred to as isotope abundance analysis (IAA)) is a much harder challenge. The challenges in the successful inversion of MS isotope abundance data into elemental formulas seems daunting for a few well established practical reasons: a) Isotope abundance analysis requires that the molecular ion will be available while it is missing from ordinary 70 ev EI mass spectra of more than 30% of the sample compounds; b) IAA requires that the relative heights of the various isotopomers can be accurately measured, including with low sample amounts during their short elution time from a GC or LC; c) IAA requires the absence of matrix and or sample induced self chemical ionization that distorts the experimentally measured isotope abundances due to uncontrolled degree of protonation; d) IAA requires the absence of vacuum background that distorts the measures isotope abundances, especially at low sample levels. e) IAA requires a useful method for the inversion of isotope abundance MS data into a short list of most probable elemental formulas that can provide a reliable method of sample identification. These obstacles and the seemingly limited possibility of success resulted in lack of motivation. Thus, isotope abundance analysis was generally neglected in view of the combination of lack of motivation, absence of automated effective inversion method and scarcity of useful experimental isotope abundances data.

In recent years a new type of electron ionization mass spectrometry with supersonic molecular beams (SMB) was developed, and applied with GC-MS and LC-MS. The use of SMB for analytical mass spectrometry is based on the introduction of sample compounds into an electron ionization ion source as vibrationally cold molecules in a seeded supersonic molecular beam. The electron ionization (EI) is performed in a unique fly-through EI ion source, adopted for the ionization of sample compounds while they are traveling along the ion source axis as vibrationally cold molecules, due to their cooling by the seeding gas in the supersonic expansion. The most important attribute of electron ionization of vibrationally cold sample molecules in SMB is that the molecular ion is significantly enhanced and it is practically always observed. In addition, the use of SMB with a light carrier (seeding) gas such as helium (or even vaporized solvent in LC-EI-MS of large molecules) enables the sample compounds to acquire directional hyperthermal kinetic energy. As a result, a unique mass spectral vacuum background filtration was achieved and the experimentally obtained mass spectra are clean, without vacuum background distortion. Furthermore, the collision free conditions prevailing in the EI of sample compounds in SMB ensure the full elimination of the adverse effects of self and matrix induced chemical ionization (CI). Consequently, electron ionization mass spectra of samples in SMB in both GC-MS and LC-EI-MS with SMB seems ideal for IAA, if an appropriate and preferably automated method will be developed for the inversion of its useful mass spectral isotope abundance data into elemental formula information.

SUMMARY OF THE INVENTION

The present invention is concerned with a method for the inversion of mass spectral isotope abundance data into informative elemental formula information.

According to the present invention there is provided a mass spectrometric based method for sample identification, comprising the steps of introducing sample compounds into a vacuum chamber of a mass spectrometer in a seeded supersonic molecular beam; ionizing with electrons the sample compounds, being vibrationally cold molecules, in said supersonic molecular beam during their flight through an electron ionization ion source; mass analyzing the ionized sample compounds with a mass analyzer of a mass spectrometer to obtain a mass spectrum of at least one compound in said sample; identifying the molecular ion group of isotopomers in said mass spectrum; generating various molecular elemental formulas with the mass of the identified molecular ion and a pre-allocated list of elements; reducing the number of said molecular elemental formulas by the incorporation of chemical valence considerations and constraints; calculating isotope abundances for said generated elemental formulas; comparing said calculated isotope abundances with the experimentally obtained mass spectral isotope abundance, and listing said generated elemental formulas according to their degree of matching to said experimentally obtained mass spectral isotope abundance.

The invention also provides a mass spectrometric based method for sample identification, comprising the steps of introducing sample compounds into an electron ionization ion source of a mass spectrometer; ionizing the sample compounds in said ion source; mass analyzing said ionized sample compounds with a mass analyzer of a mass spectrometer to obtain a mass spectrum of at least one compound in said sample; attempting the identification of said experimentally obtained mass spectrum by using an electron ionization mass spectral library to produce a sorted list of possible sample molecular identities, and sorting again said library list by a further analysis of the relative isotope abundance of the molecular ion group of isotopomers of compounds in said library list to produce a combined hit list of possible sample identities.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a flow diagram of a first embodiment of a method for sample identification according to the present invention, and FIG. 2 is a flow diagram of a second embodiment of a method according to the present invention.

DETAILED DESCRIPTION

Figure 1:
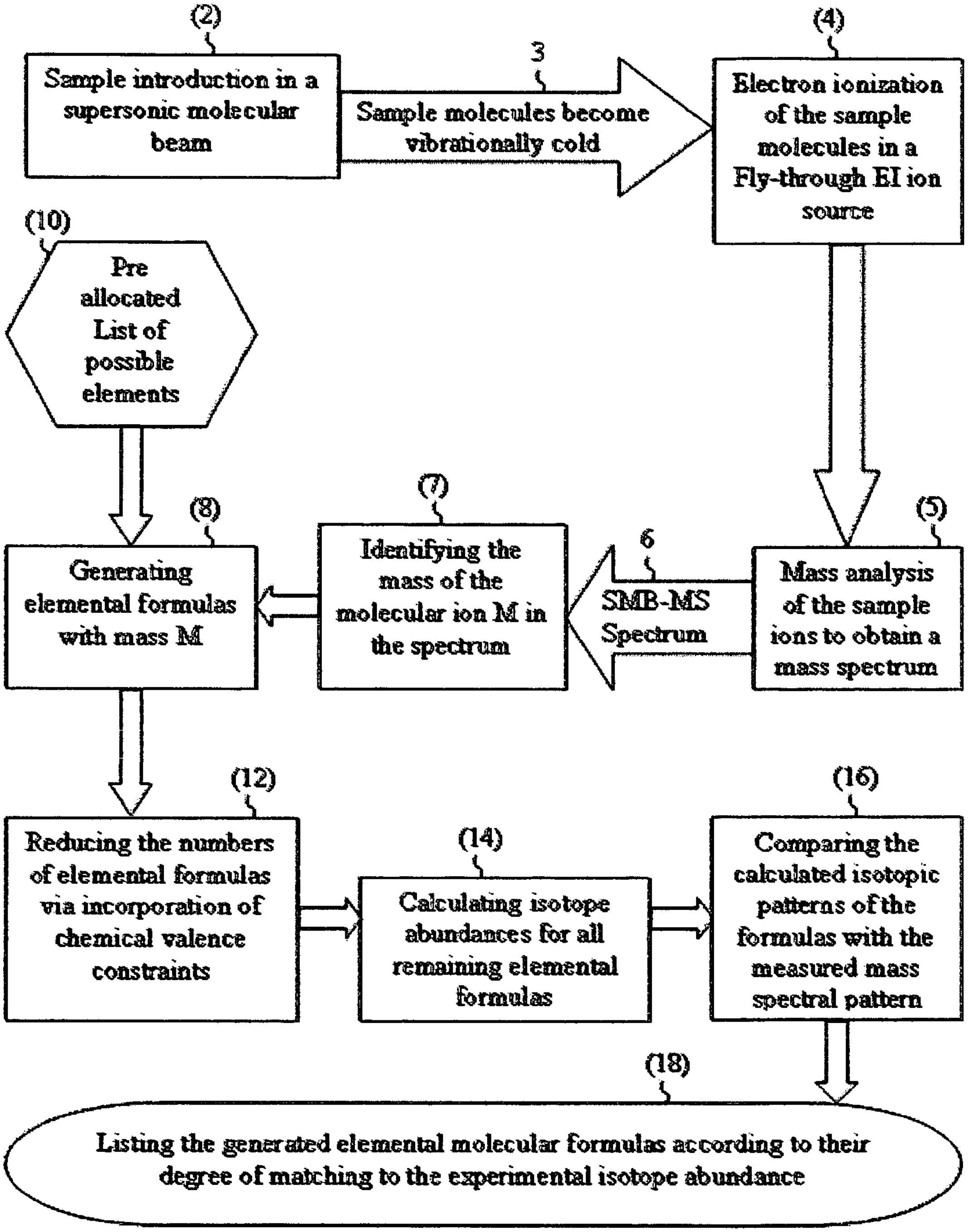

A preferred embodiment of the method for improving sample identification through the inversion of mass spectral isotope abundances into a list of possible elemental formulas according to the present invention, illustrated in FIG. 1, includes the following steps:

The sample compounds are introduced into a vacuum chamber of a mass spectrometer in a seeded supersonic molecular beam (step (2)). The sample compounds can be introduced into the SMB from a gas chromatograph, liquid chromatograph or by flow injection. The use of SMB sampling provides for a trustworthy abundant molecular ion without self or matrix CI and vacuum background distortions and for extended range of samples amenable for analysis. The sample molecules become vibrationally cold (at 3) and are ionized with electrons in a supersonic molecular beam as vibrationally cold molecules, during their flight through an electron ionization ion source (step (4)). The ionization of vibrationally cold molecules with electrons provides a unique combination of compatibility with both library identification and isotope abundance analysis. The use of a fly-through electron ionization ion source ensures the ionization of vibrationally cold molecules (hence with enhanced molecular ion) without their thermalizing scattering from the hot ion source walls. Furthermore, without the two steps above an automated or manual identification of the molecular ion group of isotopomers either cannot be achieved or cannot be trusted.

The ionized sample compounds then undergo, at (5), mass analysis with a mass analyzer of a mass spectrometer, to obtain a mass spectrum of at least one compound in the sample. This is a standard step in any mass spectrometry analysis. This step can be performed with a quadrupole mass analyzer followed by an ion detector, but it can also be performed with any available mass analyzer and ion detector combination such as ion trap, magnetic sector or time of flight. The molecular ion group of isotopomers in the SMB-MS spectrum 6 is then identified at (7). This is a non-standard step that is made practical with this method, due to the use of SMB and ionization of vibrationally cold molecules with enhanced molecular ion. Any inversion of isotope abundance data must start with the decision of which peaks in the mass spectrum are those of the molecular ion group of isotopomers. This step can be performed automatically such as with a computer based decision in which the highest mass spectral group of peaks that are higher than 5% of the average of the three highest mass spectral peaks is the molecular ion group, or by another similar computer based automated algorithm, or by the user inserted number of the molecular ion base mass. Once the molecular ion is identified, the experimental data of the isotope abundances (normalized to the most abundant isotope, usually lowest mass, molecular ion) can be automatically inserted into a table of isotope abundances. This table can have a default length of number of isotopomers that can be changed or controlled by the user.

In the next step (8) various molecular elemental formulas are generated from the identified molecular ion and an available pre-allocated list of elements (10). The elements included in the calculations and their range (plus degree of un-saturation) are either provided by a default sub-method or by the user and the computer using available methods in calculating all possible combinations of the given elements and their numbers that can yield the molecular weight (mass of the molecular ion). A further input data that can be used is the mass window around the nominal (or measured) molecular weight such as ±0.5 amu for low resolution mass spectrometers or lower values such as ±0.1 or even lower with more accurate mass spectrometer instrumentation. The number of molecular elemental formulas through the incorporation of chemical valence considerations and constraints is then reduced at (12). Accordingly, standard known chemical valence constraints are inserted and applied, to rule out elemental formulas that are chemically impossible or should be highly unstable. Such valence constraints can include that hydrogen atoms can be bonded to no more than one other element and not to itself and/or that carbon can be bonded to no more than four atoms, while oxygen can be bonded to no more than two atoms. This step significantly reduces the number of possible elemental formulas by typically two orders of magnitude, hence simplifies further calculations and makes it much faster even with modern currently available computers. This and the prior step can be performed simultaneously, for example, by using the chemical valence constraints after each generation of an elemental formula.

The isotope abundances for the generated elemental formulas are then calculated at (14). This step by itself is known in the art in the form of available isotope calculators that compute isotope abundances based on an input of given elemental formulas. According to the present invention, this step is unique in its automated operation on a list of elemental formulas that were generated from a given molecular weight, as above, that match the molecular ion of the experimental data after reducing the number of these elemental formulas through chemical valence considerations. The calculated isotope abundances and the experimentally obtained mass spectral isotope abundance are compared at (16). This step is based on a matching factor that is typically a number between zero and 1000 (or 100) that shows, in a monotonically increased way, the degree of similarity of the experimental data and the computer generated isotope abundance patterns. The matching factor can be based on a simple function of square root of the sum of the squared differences of the experimental and calculated isotope abundances. This number can be further normalized with 1000 times an exponential function of the minus of the difference number, to yield a number from zero and 1000 and further corrections can be introduced such as the normalization of the isotopic differences to the experimental isotope peak heights. The details of the mathematic treatments of this step are not critical, as many standard treatments can be used. The calculated isotope abundances of the various generated elemental formulas are compared with the experimental data and a matching factor is given to each of them to describe the degree of their similarity.

Finally, generated elemental formulas according to their degree of matching to the experimentally obtained mass spectral isotope abundance are listed at (18). This is the output data in the form of a list of possible elemental formulas that are typically organized according to a decreasing order (degree) of their matching (closeness) to the experimental data.

While the list of generated molecular formulas is arranged according to their matching to the experimentally obtained mass spectral isotope abundance, the output of the IAA method can and preferably should include additional information. For example, the exact mass of the given elemental formulas can be given and a few types of additional matching parameters can be added. These may include the average deviation from the experimental data in % and the probability of correct identification using a probability function that considers not only the matching factor of a given elemental formula but also the matching factors of the other elemental formulas. Furthermore, the IAA method can provide additional useful information by scanning its own list of possible elemental formulas. In many cases the first elemental formula on the list is the true one, but if the measured data is not accurate enough, it can be in the second place or further down the list such as among the first 20 hit list compounds. Nevertheless, in most cases the true elemental composition is one of the first few hits. According to the present method, the IAA list is scanned (the user defines how many hits to scan such as a default value of 20) and than a list of elemental boundaries information that fits all of them is provided (for example: none of them contain Chlorine atoms, all of them contain exactly one sulfur atom and all have carbon atoms in the range of 13-15 etc.). Since the list may include 20 elemental formulas, the probability of having the correct sample in it is high. The elements with known exact number can be emphasized in the report.

Using this method, it was found that when the ten most abundant elements in organic compounds are included in the calculation such as C, H, O, N, S, P, Cl, Br, F and Si and the sample compound molecular weight is over 500 amu, the computer typically generates around one million elemental formulas. After considerations of chemical valence constraints this number is reduced to around or over 10,000 that is still a very large number of possibilities. It was further found that, in order to obtain the correct elemental formula as the first hit with the best matching, it was necessary to measure the isotope abundance with both precision and accuracy of lower than 0.1%. Such precision and accuracy is hard to obtain, especially at low sample amounts, e.g., below a few nanograms with a gas chromatograph. Thus, usually the correct elemental formula is not the first hit but it is included in the top 10 hit list, although some times it can be even lower in the list of possible elemental formulas.

The position of the correct elemental formula in the generated list can be significantly improved upon the insertion of further known chemical information on the sample. For example, when an organic chemist synthesizes a new compound, the chemist knows that the synthetic product cannot contain elements that are not included in the initial reaction mixture. Hence the list of elements used to generate the IAA list can be reduced to typically four elements. In this way, the correct elemental formula is often the first or high in the IAA generated list. The insertion of additional information such as the degree (or maximum degree) of un-saturation (another chemical constraint) or NMR provided information such as a close range of the number of hydrogen and/or carbon atoms typically significantly narrow down the list and brings the correct elemental formula as number one with very high probability of correct identification.

Another way to improve the probability of correct sample identification with the IAA method is to analyze the isotope abundance of both the molecular ion group of isotopomers plus a group of isotopomers of another high mass major fragment. This approach is referred to as IAA-IAA, since it involves the IAA of two groups of peaks. In this case, two lists with separate matching factors are provided as above, and an additional third matching factor is generated that is an average of the two matching factors. Since two separate peaks are analyzed, the probability of correct identification is typically improved. A unique advantage of this IAA-IAA approach is that the output report could contain additional information on the elemental formula of the fragment plus that of the lost neutral fragment. This way the IAA method provides additional structural information.

For low sample amounts (levels) and for true unknown samples, however, there is a need for further improvement in the degree of success of IAA and the confident level it provides in sample identification.

An additional novel method of this invention is the combination of standard EI library search results and the isotope abundance analysis into a one powerful new method of sample identification. Accordingly, the list of generated molecular formulas according to their matching to the experimentally obtained mass spectral isotope abundance is further correlated with the mass spectral library and in particular with the library hit list of possible identified compounds. The basic idea is that the library provides a relatively small list of possible identification based on the mass spectral fragmentation pattern, and this list is typically limited to a hundred compounds. In fact, usually only the first top ten (or even less) candidates in the library hit list are considered as applicable for sample identification. Thus, a limited search of degree of fitting of isotope abundance among the library list of one hundred compounds typically generates the correct elemental formula, if it is included in the library hit list, with a high degree of certainty, even at low sub nanogram amounts eluting after their gas chromatographic separation. Consequently, this combination of IAA and library sample identification can serve as an independent way of confirmation or rejection (denial) of the library identification and visa versa.

Figure 2:
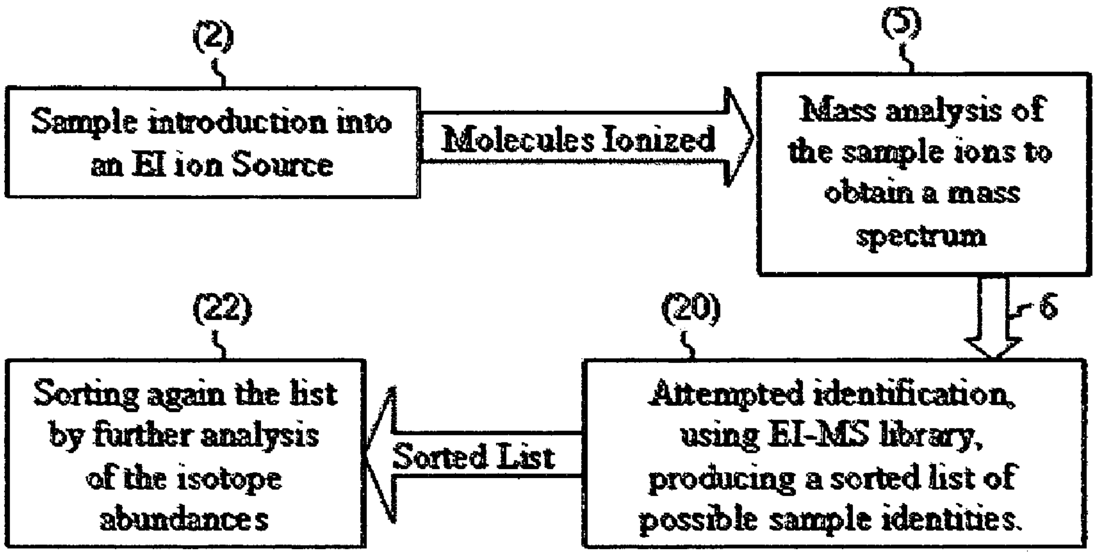

The IAA method according to this invention can be utilized with the electron ionization MS libraries, so that the combination of IAA and library results are far more informative and can provide unambiguous identification with ultimate confidence level in sample identification. This additional method encompasses a few possible steps performed after the sample mass analysis, see FIG. 2

Identification of the experimentally obtained mass spectrum is attempted at (20) by using an electron ionization mass spectral library to produce a sorted list of possible sample identities (molecules) and, by sorting again (at 22) the library-provided list of possible sample identities through a further analysis of the relative isotope abundance of the molecular ion group of isotopomers of compounds in the library-provided list of possible sample identities. In other words, the library search and IAA results are combined by sorting the library-provided list of possible sample identities through a further analysis of the relative isotope abundance of the molecular ion group of isotopomers among the listed library search results. The library search typically produces a hit list of a hundred potential compounds. These compounds are organized and listed according to the degree of matching of the library mass spectra to the experimentally obtained mass spectra or according to the probability of identification which is calculated according to the matching of the experimental mass spectrum to that of the library compounds in the hit list and in further consideration of the degree of matching of other identification candidates. Such hit list is always provided, even if the sample compound is not in the library, since the library program assumes that the molecule is known and does not know that it is not included in the library. The current invention is unique in enabling the use of the IAA method (and its associated software) to search for the matching of the experimental isotope abundances among the hit list compounds according to their library-provided names and elemental formulas. Thus, the IAA software calculates the isotope abundance pattern of all the compounds in the library hit list and compares it with the experimental isotope abundance and further calculates matching factors for the fits obtained. Then, the IAA method (through the use of its software) provides an additional but different list of the library hit list compounds that is now organized according to the matching of the experimental isotope abundance and its calculated values for the hit list compounds. If the first hit in both the library hit list and IAA hit list are the same and the IAA matching factor of the first IAA hit is high enough, than the sample compound is fully and unambiguously identified. If the IAA software indicates that the library top listed compounds are not included in the IAA list within a given predetermined matching factor threshold, or that the IAA top list is different than the library top list few compounds, than this is an evidence that the analyzed compound is either not in the library or it was incorrectly identified by the library for any other reason. In that case, the IAA method and software can provide by itself a list of possible elemental formulas through a full isotope abundance analysis without library hit list restrictions.

The combined library and IAA searches and sample identification can be automated so that every time that the user searches the library, the IAA method is automatically used to search within the library hit list and provide its separate report. Thus, the IAA method can be easy to employ and its exclusive utilization for the independent provision of elemental formulas can be employed only if it rejects the library search results. The degree of certainty of this combination can be further increased (such as when SMB is used for sampling), if the molecular ion is known with high confidence level. In that case, the IAA search among the library hit list can be limited to those compounds that have the given identified molecular ion as identified by the IAA method.

The standard use of IAA requires accurate determination of the relative peak heights of the various isotopomers, usually within 0.1%. Such accuracy requires typically over one nanogram sample size with current mass spectrometry sensitivity. There is a growing need, however, for sample identification at trace levels. For this reason, the mass spectrometer scan range can be restricted to about five amu around the molecular ion isotopomers, and this way the number of detected ions in every isotopomer peak can be increased by up to a hundred times. The precision of isotope abundance measurement can thereby be improved by an order of magnitude. While such limited scan range prohibits the standard use of library for sample identification since it is based on full range mass spectra, the use of the IAA software for sample identification is possible since it requires only the limited mass spectral range around the molecular ions group of peaks. In addition, the IAA results can be combined with the mass spectral library for the provision of improved confidence level in sample identification, even with this limited MS scan range. The use of limited mass spectral scan range is possible only if one or several target compounds are being analyzed. In that case, the molecular ion of the searched target compounds is known. Thus, according to the present method, the experimentally obtained mass spectra around the molecular ions are used to search among all the library compounds that have the same molecular ion. In a typical mass spectral library there are about 150,000 compounds that are distributed on the average in about 400 compounds per molecular weight. Thus, the IAA can search among about 400 compounds, hence this limited search provides usually high probability of correct sample identification or confirmation of identity. While the library compounds are only a small fraction of all the possible and/or known compounds, these are the more likely compounds to be encountered in environmental and industrial analyses. Thus, as before, the combination of the IAA and mass spectral library provides improved sample identification as compared to what can be obtained with any of these methods alone and at lower sample amounts or levels. In addition, standard library search cannot be performed if low electron energy ionization or photo ionization is employed, or in cases of coelution of two or more compounds. In these cases as in the case of insufficient sensitivity for IAA, limited scan range around the molecular ion enables both standard IAA and its combination with the library search in the form of IAA search of the library set of compounds having the target compound molecular ion. Such a search provides a reliable and useful new method for sample identification or confirmation of the identity of a searched compound, also at trace levels, that is equivalent or even superior in its confidence level to standard library searches. Finally, the mass spectrometer can be operated in an alternate full range scan and limited range scan to enjoy from both standard library search and improved IAA at trace levels and their combination as above.

In a few cases even EI of vibrationally cold molecules in SMB fails to provide a sufficiently abundant molecular ion and the molecular ion is below 5% relative abundance. In these cases target compounds can be analyzed at trace levels by limited mass spectral scan around the mass range of a major high mass fragment ion and its various isotopomers. In this case, either the library or standard chemical knowledge can be used to obtain the elemental formula of the target fragment, and the isotope calculator of the IAA software can calculate the expected isotope abundance of the target fragment. After that, the IAA software can provide a matching factor for the experimentally obtained fragment peaks and this matching factor can serve for sample identification if it passes a certain predetermined high matching factor criterion, the same as used with standard library search.

Accurate mass is another known and established mass spectral based method for the provision of elemental formulas. In this method the mass spectrometer accurately determines the mass of the sample compound and from the accurate mass value (typically within 3 parts per million or better accuracy) dedicated software calculates the elemental formulas using the accurate mass of the various elemental isotopes as an input. According to this invention, accurate mass can be combined with the library for the provision of improved confidence level in sample identification in an analogues way as IAA. Accordingly, accurate mass can be used to provide its own list from the library hit list and a common first hit compound implies full confirmation of the library search while inconsistency typically implies a rejection of the library search results. Similarly, a mass spectral limited scan range can be used and the accurate mass results can be searched among the library set of compounds with the target compound molecular weight. This mode can be effective especially with mass filters having accurate mass capability such as magnetic sectors but not with time of flight or Fourier transform MS, since the later are based on full scan and do not gain sensitivity with restricted mass spectral range. Obviously, accurate mass information can be used in other ways such as to restrict the number of possible IAA generated elemental formulas hence to improve its effectiveness but this advantage comes at the price of higher cost of the mass spectrometry instrumentation.

While the above described how the IAA can be used to search among the library hit list compounds, clearly the opposite can also be performed and the library can be used to search among the IAA hit list.

Isotope abundance analysis for the elucidation of empirical formulas and elemental information requires having a trustworthy molecular ion that is unique to GC-MS with SMB, plus absence of self (or matrix induced) chemical ionization and vacuum background. Thus, it cannot be effectively used with standard GC-MS. Furthermore, the IAA method according to this invention is especially useful for large and thermally labile compounds that are more likely not included in the library and that are uniquely compatible with GC-MS with SMB analysis. In addition, with the LC-EI-MS with SMB, unlike with ESI and APCI, the molecular ion is pure, without unknown degree of one or more proton transfer or hydrogen abstraction and charge exchange or addition of adducts. The use of exact mass elucidation of elemental formula on an adduct ion can lead to false identification while in contrast, with LC-EI-MS with SMB, IAA is combined with library search for unambiguous identification that is better than with library alone.

It should be recognized, however, that IAA is also applicable to and valuable with standard GC-MS since the later provides library searchable EI mass spectra and if the vacuum system is clean, the sample has low proton affinity (hence unaffected by self or matrix chemical ionization) and the sample has significant abundant molecular ion. In that case, IAA according to the present invention can be an effective method for improved sample identification, particularly in combination with the library as described above. While SMB is the preferred mode of sample introduction into the ion source, the sample can also be introduced directly into an EI ion source or another ion source from an MS probe, gas chromatograph or liquid chromatograph. GC-MS are widely used and in them the column enters directly into a standard 70 eV EI ion source. When Electrospray or chemical ionization or atmospheric pressure chemical ionization are used, the IAA method according to this invention can also be useful if the degree of ionization induced protonation is close to 100% since in these cases the molecular ion is simply shifted by 1 amu while the correct isotope abundance is retained. For these cases the method properly considers the shift of 1 amu of the molecular ion group of isotopomers by a user-defined addition of a hydrogen atom to the searched compound.

The IAA method according to this invention can also be used for certain applications that do not require sample identification but rather isotope abundance information. These applications include isotope enrichment or depletion experiments such as fat and/or drug metabolism, geochemistry such as age markers, food adulteration and isotope dilution analysis, which is the most accurate method for quantification.

The process of IAA calculation can be complex thus need to be restricted to a given default with user-defined modifications. In standard organic analysis the following elements are typically used C, H, O, N, S, P, Cl, F, Br, Si, and in a second table a choice of some 50 other elements can be included such as As, Sn. Se, Fe, Mn, etc. If needed in terms of computer time, a limited number of each element can be introduced by the user.

EXAMPLES

The IAA method according to this application will be further explained by way of non-limiting examples with a few real sample compounds. The IAA methods described above were implemented in an IAA software that automatically performs IAA. The following are a few typical results:

A mixture of 9 pesticides including dimethoate ($C_5H_{12}NO_3PS_2$) at 10 μg/ml concentration was analyzed with GC-MS with SMB. The library identified dimethoate as the first hit with 725 (out of 999) matching factor and 93% claimed probability of identification.

When the experimental mass spectrum of dimethoate was analyzed by the IAA method (without any correlation with the library), the IAA software automatically identified the molecular ion in the mass spectrum at m/z=229 and automatically downloaded the relative abundances of the six isotopomers normalized to m/z=229 as 100%, m/z=230 as 7.62%, m/z=231 as 9.96%, m/z=232 as 0.93%, m/z=233 as 0.39% and m/z=234 as 0.07%. These isotope abundances gave a very good matching factor of 920 and low average error of 0.173%, but it was ranked only as number five, with 8.1% probability of identification. In this IAA analysis, the software used the following list of elements: C with 0-19 atoms range, H with 0-40 atoms range, O with 0-6 atoms range, N with 0-6 atoms range, S with 0-4 atoms range, P with 0-4 atoms range, Cl with 0-4 atoms range, Br with 0-2 atoms range and F with atoms 0-2 range. The upper number of carbon atoms was automatically inserted as the molecular weight divided by 12 while that of hydrogen is the number of carbon atoms times two plus two. The upper number of atoms of the other elements is given by a user-defined method with default values. The software generated and scanned 992250 elemental compositions of these elements and found 1789 chemically possible elemental compositions. 16 elemental compositions among those gave matching factors above the selected onset (threshold) of 800 upon their comparisons with the experimental mass spectrum. Naturally, among so many options it was hard to find dimethoate as the first hit, and having it as number five is a reasonably good result. The IAA, however, provided additional useful information about the boundaries of the 16 compounds that passed the threshold matching factor of 800 and showed the results that carbon was in the range of 3-5 atoms, hydrogen 0-15, nitrogen 1-5, oxygen 1-5, fluorine 0-2, no chlorine and no bromine atoms were included while exactly 2 sulfur atoms were included in all of the 16 top IAA listed compounds.

When the IAA method and software in combination with the library was further used, the IAA method and software confirmed the identification of dimathoate by sorting again the library provided list of possible sample identities through the isotope abundance analysis of the molecular ions of all the 100 compounds in that library hit list, and dimethoate was ranked as number one in the IAA list with 920 matching factor, 0.173% average IAA error and 99.95% IAA claimed probability of identification. Combined, these two methods yielded what was considered to be as unambiguous identification of dimethoate that was much better than by each method alone.

When the same pesticide mixture was analyzed at a lower concentration level of 1 μg/ml, the IAA method confirmed the library identification (that now yields only 90.3% probability of identification) and provided a 99.41% confidence level in the identification of dimethoate. Similarly, all 9 pesticides that were investigated (dichlorovos, dimethoate, diazinon, carbaril, pholpet, endosulfan piperonylbutoxide, permethrin and deltamethrin in order of their elution times) were properly identified by the 70 eV EI mass spectral library and were confirmed by their IAA, resulting in unambiguous identification of all these pesticides.

The analysis of dimethoate was also attempted with standard GC-MS and was properly identified by the library, but its IAA analysis could not be performed, since its molecular ion was too weak, having relative abundance of only 2% that was insufficient for IAA in view of some background interference. In contrast, with GC-MS with SMB the molecular ion was the dominant mass spectral feature. On the other, hand, ethion (another pesticide) was correctly identified by the IAA software even with standard GC-MS analysis and the IAA software properly confirmed the library identification.

A compound named triacetonetriperoxide (TATP) was analyzed by GC-MS with SMB. TATP is a thermally labile compound with two conformers. In standard GC-MS, TATP decomposes and only about 10% of its one conformer elutes while the second slightly less volatile conformer is lost in the column (being fully decomposed). TATP could not be analyzed by IAA in combination with standard GC-MS as it did not show a molecular ion and the mass spectrum provided was void of informative mass peaks. When it was analyzed by GC-MS with SMB, the mass spectra revealed a dominant molecular ion at m/z=222. The library search provided as the first hit a compound with molecular weight of 442 amu with relatively high 824 matching factor and 79.8% probability of identification. Since clearly such heavy compound cannot elute at the elution time of the analyzed TATP it was obvious that the library identification is false. The IAA software informed that the molecular ion of the library first hit was missing from the experimental mass spectrum and that the first hit in the IAA list was a compound that was listed as number 44 in the library hit list. Clearly the IAA rejected the library identification. An independent IAA of the experimental mass spectrum was performed with the following list of elements; C with 0-18 atoms range, H with 0-38 atoms range, O with 0-6 atoms range, N with 0-5 atoms range, S with 0-2 atoms range, P with 0-2 atoms range, Cl with 0-4 atoms range and Br with 0-2 atoms range. 102061 elemental compositions were scanned, 766 chemically possible elemental formulas were found and 8 of them passed the default minimum matching value of 800. TATP with its elemental formula $C_9H_{18}O_6$ was ranked as number one with very high 982 matching factor, 0.074% average error and 86.88% IAA claimed probability of identification. In this example TATP was easily identified by the IAA as the first (top) IAA listed compound and the IAA both rejected the library false identification and independently properly identified the compound.

A synthetic organic chemist provided a novel compound with a suspected elemental formula of $C_{15}H_{26}O_4S_2$ (molecular weight of 334 amu) based on a synthetic method and he needed to confirm this elemental formula. This compound could not be analyzed by standard GC-MS as it did not provide any molecular ion in EI as well as in CI. The library search gave the usual 100 compounds hit list with $C_7H_4INS$ at the top of the library hit list with 817 matching factor and 49.6% claimed probability of identification. The IAA software rejected the library identification and listed the library number 8 hit compound as number 1 in the IAA list, while the library top listed compound was number 25 in the IAA list with poor IAA matching factor of 12, which is a clear rejection of the library identification. An independent IAA of the experimental mass spectrum was performed with the following list of elements; C with 0-27 atoms range, H with 0-56 atoms range, O with 0-6 atoms range, N with 0-5 atoms range, S with 0-2 atoms range, P with 0-2 atoms range, Cl with 0-4 atoms range and Br with 0-2 atoms range. The method scanned 442260 elemental compositions, found 3367 possibly correct elemental formulas and 332 elemental formulas with matching factors above the default threshold value of 800. The investigated compound was listed as number 9 in the IAA list with a relative very high matching factor of 990 and average error of 0.232%, but since it was number 9, its IAA claimed probability of identification was only 1.78%. The synthetic organic chemist that brought this sample, however, provided further chemical information on this compound such as that no nitrogen, phosphorus, chlorine or bromine atoms can be included (in view of his synthetic steps and raw materials) and that the maximum degree of unsaturation could not be higher than five. With these constraints added to the IAA program, only 42 chemically possible compounds were found by the IAA software and only 16 among them passed the 800 matching factor threshold. The correct compound was now listed as number one at the top of the list, with 60.39% IAA claimed probability of identification. Later on, that compound was also analyzed by NMR that indicated that the number of hydrogen atoms must be between 24 and 28. Upon the insertion of this further information into the IAA program only three chemically possible compounds were found from which only two passed the 800 matching factor threshold and the correct compound was now listed at the top with 99.98% claimed IAA probability of identification. A dual IAA on both the molecular ion (m/z=334) and a high mass fragment was also performed and the IAA software correctly automatically loaded the group of isotopomers above the m/z 261 main fragment. The results were that the IAA of the fragment gave an excellent 998 matching factor and additional structural information that the lost fragment was $C_3H_5O_2$, which is in agreement with the later elucidated structure by NMR. Thus, with the addition of chemical information IAA was proven to be an effective identification tool, especially in combination with mass spectrometry with SMB.

It will be evident to those skilled in the art that the invention is not limited to the details of the foregoing illustrated embodiments and that the present invention may be embodied in other specific forms without departing from the scope or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A mass spectrometric based method for sample identification, comprising the steps of:

introducing sample compounds into a vacuum chamber of a mass spectrometer in a seeded supersonic molecular beam;

ionizing with electrons the sample compounds, being vibrationally cold molecules, in said supersonic molecular beam during their flight through an electron ionization ion source;

mass analyzing the ionized sample compounds with a mass analyzer of a mass spectrometer to obtain a mass spectrum of at least one compound in said sample;

identifying the molecular ion group of isotopomers in said mass spectrum;

generating various molecular elemental formulas from the identified molecular ion and a pre-allocated list of elements;

reducing the number of said molecular elemental formulas by the incorporation of chemical valence considerations and constraints;

calculating isotope abundances for said generated elemental formulas;

comparing said calculated isotope abundances with the experimentally obtained mass spectral isotope abundance, and listing said generated elemental formulas according to their degree of matching to said experimentally obtained mass spectral isotope abundance.

2. The method according to claim 1, wherein said sample is introduced into said supersonic molecular beam from a gas chromatograph.

3. The method according to claim 1, wherein said sample is introduced into said supersonic molecular beam from a liquid chromatograph.

4. The method according to claim 1, wherein said list of said generated elemental formulas according to their matching to said experimentally obtained mass spectral isotope abundance, includes additional molecular information on the listed possible elemental formulas concerning their isotope abundance fitting, an estimate of the probability of correct identification and elemental boundaries.

5. The method according to claim 1, wherein said isotope abundance analysis is performed on the molecular ion group of isotopomers plus on an additional group of isotopomers of a fragment ion.

6. The method according to claim 1, wherein said list of said generated elemental formulas according to their matching to said experimentally obtained mass spectral isotope abundance is further correlated with an electron ionization mass spectral library hit list of possible identified compounds.

7. The method according to claim 6, wherein said list of said generated elemental formulas according to their matching to said experimentally obtained mass spectral isotope abundance is further used to confirm or reject the library based sample identification.

8. A mass spectrometric based method for sample identification, comprising the steps of:

introducing sample compounds into an electron ionization ion source of a mass spectrometer;

ionizing the sample compounds in said ion source;

mass analyzing said ionized sample compounds with a mass analyzer of a mass spectrometer to obtain a mass spectrum of at least one compound in said sample;

attempting the identification of said experimentally obtained mass spectrum by using an electron ionization mass spectral library to produce a sorted list of possible sample molecular identities, and sorting again said library list by a further analysis of the relative isotope abundance of the molecular ion group of isotopomers of compounds in said library list to produce a combined hit list of possible sample identities.

9. The method according to claim 8, wherein the step of sorting again said library by a further analysis of the relative isotope abundance of the molecular ion group of isotopomers, includes the further steps of:

listing the elemental formulas of the compounds in said library hit list;

calculating isotope abundances for said library generated list of elemental formulas;

comparing the calculated isotope abundances of said compounds in said library list with the experimentally obtained mass spectral isotope abundance;

listing said library hit list elemental formulas according to their degree of matching to said experimentally obtained mass spectral isotope abundance;

comparing said library hit list and the generated isotope abundance analysis list of said library listed compounds, and determining, based on the correlation of the two lists, if the library identification is correct or incorrect.

10. The method according to claim 9, wherein said library hit list is used with its first predetermined number of hits that are the closest to the experimental mass spectrum.

11. The method according to claim 9, wherein said library hit list is used with its first predetermined number of hits that are the closest to the experimental mass spectrum that also have the same molecular ion mass as determined by the IAA method.

12. The method according to claim 9, wherein said library list contains all the library molecules that have the same molecular ion mass as determined by the IAA method.

13. The method according to claim 9, wherein said sorting of said library list of possible sample identities with the relative isotope abundance of the molecular ion group of isotopomers, further include accurate mass constraints on the molecular ion.

14. The method according to claim 9, wherein said electron ionization mass spectral library is of 70 eV electron ionization mass spectra.

15. The method according to claim 8, wherein said sample compounds are introduced into said electron ionization ion source as vibrationally cold molecules in a seeded supersonic molecular beam.

16. The method according to claim 8, wherein said library list of possible sample identities contains compounds having a user defined molecular weight.

17. The method according to claim 8, wherein said library list of possible sample identities is automatically sorted by isotope abundance analysis and a report is provided if the IAA confirms or rejects the library identification.

18. The method according to claim 8, wherein said sample compounds are introduced into said electron ionization ion source of a mass spectrometer from a gas chromatograph.

19. The method according to claim 8, comprising the further step of utilizing the isotope abundances of both the molecular ion and at least one additional fragment for its inversion into the identification of the sample elemental formula.

20. The method according to claim 8, wherein the step of attempting the identification of said experimentally obtained mass spectrum is performed by the analysis of the relative isotope abundance of the molecular ion group of isotopomers followed by sorting the obtained isotope abundance analysis list of results by additional electron ionization mass spectral library search among said list to produce possible sample compound identities.

* * * * *